Dec. 11, 1956 R. A. J. DAWSON Re. 24,254

DEEPWATER SUBMERSIBLE BARGE

Original Filed March 23, 1955 2 Sheets-Sheet 1

ROBERT A.J. DAWSON
INVENTOR

BY Murray Robinson
ATTORNEYS.

Dec. 11, 1956 R. A. J. DAWSON Re. 24,254

DEEPWATER SUBMERSIBLE BARGE

Original Filed March 23, 1955 2 Sheets-Sheet 2

ROBERT A. J. DAWSON
INVENTOR.

BY Murray Robinson

ATTORNEYS

United States Patent Office

Re. 24,254
Reissued Dec. 11, 1956

24,254

DEEPWATER SUBMERSIBLE BARGE

Robert A. J. Dawson, West University Place, Tex.

Original No. 2,653,452, dated September 29, 1953, Serial No. 85,931, April 6, 1949, which is a continuation of application Serial No. 584,330, March 23, 1945. Application for reissue August 12, 1954, Serial No. 449,535

7 Claims. (Cl. 61—46.5)

Matter enclosed in heavy brackets [ ] appears in the original patent but forms no part of this reissue specification; matter printed in italics indicates the additions made by reissue.

This invention relates to the drilling of wells in water submerged areas, and more particularly to a drilling barge which may be positioned upon a submerged surface and utilized when in such position for deep well drilling operations.

This application is a continuation of my prior application S. N. 584,330 filed March 23, 1945, now abandoned, entitled "Deep Water Submersible Barge" which was copending herewith.

In the manner disclosed in the Giliasso Patent No. 1,681,533, it has been a practice in relatively shallow submarine drilling to utilize a submergible barge having an elevated superstructure upon which is mounted drilling equipment and such other equipment as is necessary for controlling ballast conditions in the barge. Such a barge, and associated equipment, is floated to the drilling site whereupon ballast is admitted, as necessary, so that the barge submerges and rests upon the surface of the area in which drilling is to be carried out. After drilling is completed the structure is freed from the supporting surface and floated to a new location.

Various difficulties have been experienced in the prior art exemplified by the above-mentioned patent. For example, the depth at which drilling operations can be carried out is relatively limited, primarily because of the effect of wind and waves when floating the barge to location. Also the submerged barge becomes firmly attached to the supporting surface and is subsequently released therefrom with difficulty and hazard. Such hazard involves both the barge and its equipment, and the well producing equipment installed for continued production of the completed well. In order to release and float the barge when drilling operations are completed, excessive underwatering of the compartments of the barge is necessary, and release is followed by a rapid rise of the barge. The erratic movement of the barge at such time endangers the well producing equipment theretofore installed. Furthermore, the center of gravity of the barge and associated equipment under such conditions is higher than during normal floating conditions so that increased instability exists and there is even greater danger of capsizing of the barge under the effects of wind and waves.

It is the primary object of the present invention to provide a drilling barge which is so constructed that the difficulties above indicated are minimized.

Another object is to provide a drilling barge which may be safely used in more deeply submerged areas than in the prior art practices.

A further object is to provide a barge in which the effect of wind and waves is minimized.

A still further and more specific object is to provide a drilling barge which comprises a submerged or base pontoon and a supplemental pontoon so constructed and arranged that the location of the metacenter above the center of gravity of the barge and its associated equipment is assured.

Still another object is to provide a drilling barge including an underwater pontoon which is maintained submerged and which is therefore relatively unaffected by surface waves.

It is also an object to provide a barge having supplemental lift pontoons and means for adjusting the elevation of these pontoons.

A further object is to provide cooperating base pontoons and supplemental pontoons and means for nesting the latter into the former.

A still further object is to provide a plurality of underwater or base pontoons and interconnecting means therefor, such interconnecting means providing for limited vertical movement therebetween whereby the barge can adapt itself to the supporting surface and the release of the underwater pontoons from such surface can be sequentially effected.

Still another object is to provide a barge having pontoons with chamfered peripheral edges to minimize adhesion to the supporting surface and to assist in the initiation of release from such surfaces.

Another object is to provide a drilling barge which may be easily released from the surface upon which it is supported during drilling, and thereafter skidded from location about the completed well.

A further object is to provide a barge which is so constructed that an uneven trim fore and aft may be provided to facilitate skidding from about the completed well.

Still another object is to provide a barge which is so constructed and arranged that correlation of buoyant forces thereon enables accurate control of movements of the barge and in particular of vertical movements when moving from location at which operations have been completed.

The foregoing objects together with additional objects and advantages of the invention will be more fully apparent from the following description considered in connection with the accompanying drawings in which.

Figure 1:
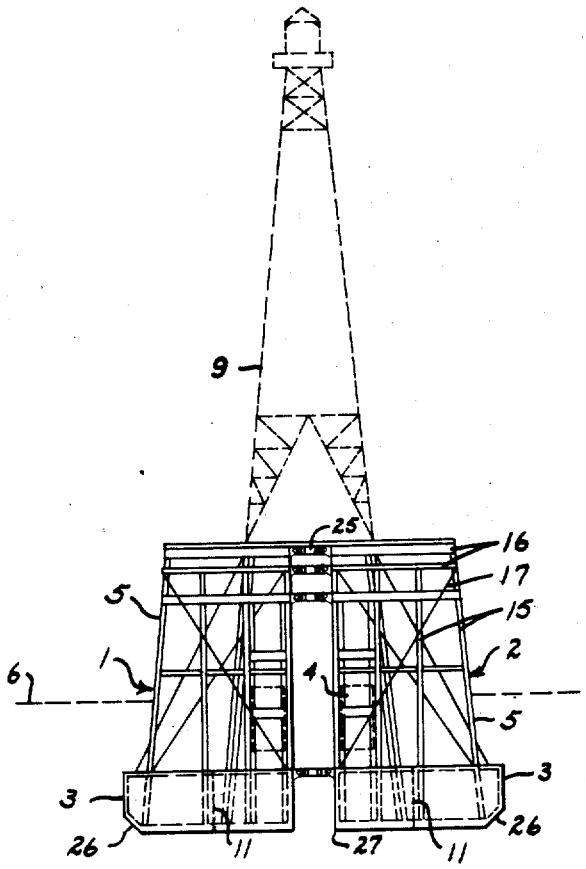
Figure 1 is an end elevational view of a barge embodying the invention.
Figure 2:
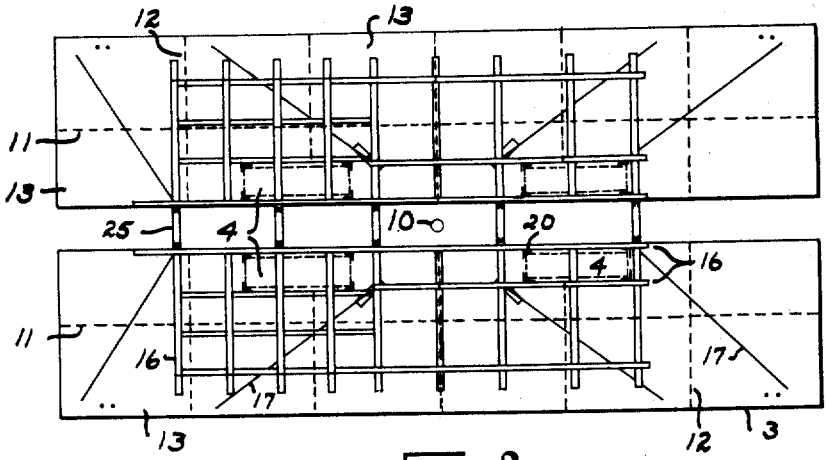
Figure 2 is a plan view of the structure shown in Figure 1.

The term "drilling barge" as used herein comprehends any barge of the submergible type or similar vessel designed for use in carrying out subsurface operations from the surface, or a point thereabove.

In its preferred form, the invention comprehends a barge including sections 1 and 2 in side-by-side relation, each of said sections including an underwater or base pontoon 3 of which the buoyancy and ballasting effects are enhanced by one or more supplemental pontoons 4 which are adapted to rise within the interconnecting framework 5 extending upwardly above the normal transportation water line indicated at 6. The framework 5 supports elevated platforms or floors 7 and 8 upon which men can work and on which the derrick 9 and other drilling and control equipment needed for off-shore drilling or the operating equipment for other marine operations are mounted.

The base pontoons 3 and the supplemental pontoons 4 are hollow fluid tight bodies of ample size and so arranged as to provide adequate buoyancy and desired stability, on location, when removing from location, and when transporting the barge to a new location. This feature is of importance. During transportation from one location to another, and especially in large expanses of water, the barge must be sufficiently stable to withstand both wind and waves; accordingly, construction must be such that the center of gravity is low, and at the same time the metacenter of the barge and associated equipment shall be high. As will be more fully apparent, these requirements are met by the provision of both submerged or base pontoons 3 of large displacement corresponding to large buoyancy when deflooded and the supplemental pontoons 4 to which reference has just been made which are of but smaller displacement corresponding to lower maximum buoyancy, i. e., when deflooded. By means of this construction the base pontoons are maintained beneath the surface of the submerging medium, except in shallow water, the supplemental pontoons 4 being substantially awash. Thus, both buoyancy and ballasting may be controlled in such a manner as to provide desired conditions of stability. In a similar manner, desired conditions can be obtained and controlled to enable breaking away from location and movement therefrom without disturbing well completion equipment installed within the well which is indicated at 10.

To enable operating features as above indicated the pontoons 3 are provided with a suitable number of longitudinal bulkheads 11 and transverse bulkheads 12 forming compartments 13 within these pontoons. Openings are provided in the upper surfaces of the pontoons 3 so that as shown in dotted lines in Figure 3 the supplemental pontoons 4 may rest therein with their centers of displacement close to the level of the centers of displacement of the base pontoon.

The framework 5 comprises suitable studs or columns 15 having small horizontal dimensions compared to their spacing, girders 16, and such bracing therefor as may be deemed necessary. In the drawings there is shown a plurality of cables or bars 17 which are intended to be used instead of, or supplemental to, bracing within the framework 5. This openwork construction for supporting the operating floors leaves large openings for the passage of air and water through the support construction and presents a relatively small area in any direction obstructing such air and water flow so that the fluid dynamic forces on the vessel are minimized.

Figure 4:
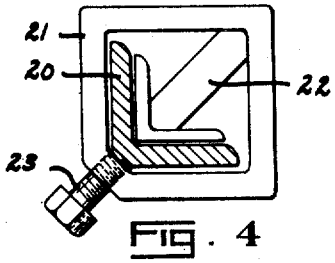
Figure 4 is a sectional view taken on line 4—4 in Figure 3.

From within the nesting compartments of the pontoons 3 there extends upwardly a plurality of guideways 20 which, as best seen in Figure 4, are angular in cross section. These guideways are located at the corners of the supplemental pontoons 4 and serve to guide these pontoons between vertical positions within the framework 5.

During transportation of the barge, the pontoons 4 are anchored at such predetermined level that desired conditions of transportation are obtained. To this end, suitable fastening means is provided within the framework to determine the upward limit of travel of the pontoons 4. One form of such means is shown in Figure 4 as comprising a collar 21 which surrounds the guideway 20 and which includes an inwardly extending arm 22 so that clamping engagement with the guideway 20 is effected when the set screws 23 are tightened into engagement with the apex of the guideway. It seems apparent that the nether surface of each of the clamp members 21 is engageable by the associated pontoon 4 whereby the upper limit of movement of such pontoon is determined.

Figure 3:
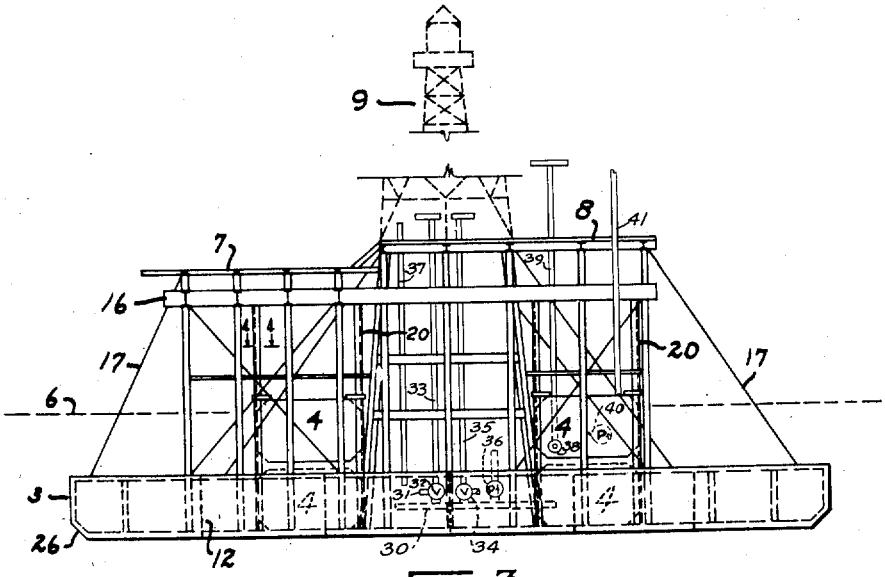
Figure 3 is a side elevational view of the drilling barge.

Suitable means is provided for introducing water ballast to, or withdrawing water from, the respective pontoons 3 and 4, to adjust each of their average specific gravities over a range between a low gravity buoyant condition and a high gravity sinking condition so that desired buoyancy and trim are obtained. As an example of a suitable means to control the ballast in the pontoons 3 and 4 may be mentioned the system disclosed in the aforementioned Giliasso patent. Such a ballast control means is illustrated in Figure 3 as comprising in each pontoon 4 a distribution pipe 30 having a plurality of outlets such as outlet 31 providing a connection to each compartment of the pontoon. Each outlet is controlled by a valve such as 32 operated manually from the upper deck by means of a long valve stem 33. A seacock 34 is connected to pipe 30 and is controlled by valve stem 35. A pump 36 is also connected to pipe 30. Each compartment of pontoon 4 is vented by means of a pipe such as 37. Selective flooding of the compartments is accomplished by means of the seacock 34 which together with appropriate ones of the individual compartment valves 32 is opened to admit ballast water. Deflooding is accomplished by means of pump 36 which is operated to remove ballast water through pipe 30 from any compartment whose valve 32 is open. The vent pipes 37 provide passages for the exhaust of air during flooding and intake of air during deflooding. In like manner, each pontoon 3 such as that at the right of Figure 3 is provided with a seacock 38 operated by valve stem 39, a pump 40, and a vent pipe 41. In order to make a clearer showing of the other parts of the device, the means for flooding and deflooding or controlling the ballast of pontoons 3 and 4 have been omitted except in Figure 3 and there shown only in part, it being understood that like means is used with all of the pontoons 3 and 4 and each compartment of pontoons 4. A fuller description of such means is included in the aforementioned Giliasso patent. It is further to be understood that any other suitable means can be used to introduce and withdraw ballast from the pontoons.

While the respective sections 1 and 2 are integral structures, such sections are [internected] *interconnected* by means of links 25 so that the entire structure will operate as a unit. These links are pivotally attached to the sections 1 and 2 so that there can be limited vertical movement of one of these sections with respect to the other. If, when on location, the sections 1 and 2 are at slightly different levels, the derrick 9 may be leveled by jacks and/or wedges after the barge is in final location upon the supporting surface.

To assist in breaking the barge from the bottom the pontoons 3 are provided with chamfered edges 26 which may also include the inboard edges 27 although in its preferred form these latter edges are unchamfered so that efficient action with guide piling may be had as more fully pointed out hereinafter.

The operation and advantages of the barge as above described are believed apparent from the description. By way of summary it will be assumed that the barge is on location and that a well 10 has been completed including a well-head installation which extends upwardly a suitable distance, usually above the surface 6 of the submerging medium. The lowermost links 25 are then removed at one end of the elongated space between the pontoons 3. Floating operations are then begun by unwatering compartments of the respective pontoons 3 and 4 which previously have been flooded, the pontoons 3 resting on bottom and the pontoons 4 nesting therewithin.

Preferably the supplemental pontoons 4 are first floated to their uppermost position as determined by the clamp 21 upon the guideways 20. Unwatering of the compartments within the base pontoons 3 is then carried out, it being preferable to effect sequential breaking away of the pontoons from the supporting surface. That is to say, one section of the barge may be released while the other is used as an anchor or pilot. Such released section may then be replaced on bottom and in turn used as an anchor or pilot while the other is released. Then both sections are floated simultaneously and the elevation of the base pontoons can be adjusted by raising and lowering the supplemental pontoons and clamping them in their adjusted positions. The supplemental pontoons, as is apparent from the foregoing description thereof, can be raised and lowered by unwatering and flooding, or they can be raised and lowered manually. In case a supplemental pontoon is to be lowered by flooding it will be observed that the barge will be kept afloat with the aid of others of the supplemental pontoons.

By virtue of the structure which includes both base and supplemental pontoons, slight lifting may be effected, and likewise fore and aft trims may be provided whereby the after end of the pontoons 3 may drag while the forward ends thereof may be lifted slightly from the submerged surface. To assist in removal operations guide piling may be provided between the base pontoons 3. Since the elevation of the barge may be accurately controlled and the points of contact with these piling maintained closely adjacent the submerged surface, safe removal of the barge from about the completed well is assured.

In the manner just indicated the barge may be controllably removed from position about the well 10 whereupon desired transport conditions may be established. It seems apparent that the chamfered edges 26 on the pontoons 3 reduce the suction hold of the submerged surface upon the pontoons whereby the effort required to release the barge from the bottom is reduced. This feature together with the fact that the pontoons may be sequentially released enables constant control of the barge.

Attention is also directed to the fact that, under some circumstances, it may be desired to entirely disconnect the two sections 1 and 2. In such case obviously the derrick 9 is dismantled and, together with the remaining equipment, positioned upon the barge sections 1 and 2. Normally towing action would be applied to the windward section of the barge during the disconnecting of the links 25. When the disconnect is complete the windward barge section is safely floated from the site. Thereafter the lee section can likewise be safely floated away, whereupon the sections may be transported separately or may be reunited for transportation and reuse.

Broadly the invention comprehends a drilling barge which may be utilized in drilling operations within a submerged area and which may be readily removed from a drilling location and safely transported to a succeeding location.

What is claimed is:

1. A submergible barge for submarine operations comprising a plurality of base pontoons, at least one supplemental pontoon for each of said base pontoons, a framework interconnecting said base pontoons for limited vertical movement therebetween, said framework providing a substructure for operating equipment, and means anchoring each said supplemental pontoon to said barge in predetermined buoyant positions above the base pontoons whereby said base pontoons are maintainable submerged with the center of gravity of the barge low relative to the surface of the submerging medium.

2. A submergible barge for submarine operations comprising a plurality of base pontoons, a framework interconnecting said pontoons for limited vertical movement therebetween, said framework providing a substructure for operating equipment, a supplemental pontoon for each of said base pontoons, guideways extending upwardly from said base pontoons, and means for limiting upward movement of said supplemental pontoons in said guideways whereby the barge is floatable with the base pontoons submerged.

3. A submergible barge for submarine operations comprising a pair of base pontoons in side by side relation, a plurality of supplemental pontoons, at least one of said supplemental pontoons being nestable in each of said base pontoons, a framework interconnecting said base pontoons and extending upwardly therefrom, guideways for said supplemental pontoons extending upwardly from said base pontoons, said supplemental pontoons being constrained by said guideways to movement along said guideways relative to the rest of said barge between positions in which said supplemental pontoons are nested in said base pontoons and positions in which said supplemental pontoons are disposed above said base pontoons and means anchoring said supplemental pontoons to said barge, said means being adjustable to anchor said supplemental pontoons in any desired positions along said guideways including positions in which said supplemental pontoons are disposed above said base pontoons whereby the barge may be transported with the base pontoons submerged.

4. A submergible [bare] *barge* for submarine operations comprising a principal apparatus including a hollow totally closed water-tight submersible base pontoon, means to introduce ballast into said base pontoon and to withdraw ballast from said base pontoon, said base pontoon having sufficient buoyancy when without ballast to float the [the] entire barge, an openwork rigid supporting structure secured to said base pontoon and rising thereabove, and a floor carried by said structure above said base pontoon and spaced therefrom a substantial distance whereby when said base pontoon is sunk to the marine bottom in water having a lesser depth than the height of said base pontoon plus said distance said floor will be above water; a supplemental pontoon, rigid means connected to said apparatus constraining said supplemental pontoon to motion relative to said apparatus along a predetermined path, said path including a position in which the center of displacement of the supplemental pontoon is above that of said base pontoon and a position in which the center of displacement of said supplemental pontoon is close to that of said base pontoon and successive positions intermediate therebetween as regards the vertical component of the distance between the centers of displacement of said pontoons, means to introduce ballast into and to withdraw ballast from said supplemental pontoon, said supplemental pontoon when without ballast being buoyant but having less buoyancy than said base pontoon when without ballast, and means for anchoring said supplemental pontoon at a desired position along said path against upward movement relative to said base pontoon, said means for anchoring being adjustable as to the position along said path at which said supplemental pontoon is anchored, said distance of said floor above said base pontoon being independent of the position at which said supplemental pontoon is anchored.

*5. A submergible barge for submarine operations comprising a principal apparatus including an elongated hollow totally closed water-tight submersible base pontoon means, said base pontoon means having a pair of spaced portions defining a lengthwise disposed opening extending from one end of said base pontoon means defining a space through which drilling operations can be conducted, means to introduce ballast into said base pontoon means and to withdraw ballast from said base pontoon means, said base pontoon means having sufficient buoyancy when without ballast to float the entire barge, an openwork rigid supporting structure secured to said base pontoon means and rising thereabove, and a floor carried by said structure above said base pontoon means and spaced therefrom a substantial distance whereby when said base pontoon means is sunk to the marine bottom in water having a lesser depth than the height of said base pontoon means plus said distance said floor will be above water; a derrick connected to said apparatus and disposed over said opening, a supplemental pontoon, rigid means connected to said apparatus, said supplemental pontoon including means co-acting with said rigid means, said rigid means constraining movement of said supplemental pontoon means to a predetermined path relative to said apparatus, said path including a position in which the center of displacement of the supplemental pontoon is above that of said base pontoon means and a position in which the center of displacement of said supplemental pontoon is close to that of said base pontoon means and successive positions intermediate therebetween as regards the vertical component of the distance between the centers of displacement of said pontoon and said pontoon means, said path being displaced from the midship section of said base pontoon means toward the end thereof opposite from*

*said end from which extends said opening, means to introduce ballast into and to withdraw ballast from said supplemental pontoon, said supplemental pontoon when without ballast being buoyant but having less buoyancy than said base pontoon means when without ballast, and means for holding said supplemental pontoon at a desired position along said path against upward movement relative to said base pontoon means, said means for holding being adjustable as to the position along said path at which said supplemental pontoon is held, said distance of said floor above said base pontoon means being independent of the position at which said supplemental pontoon is held.*

*6. A submergible barge for submarine operations comprising a principal apparatus including a hollow totally closed water-tight submersible base pontoon, means to introduce ballast into said base pontoon and to withdraw ballast from said base pontoon, an openwork rigid supporting structure secured to said base pontoon and rising thereabove, and a floor carried by said structure above said base pontoon and spaced therefrom a substantial distance whereby when said base pontoon is sunk to the marine bottom in water having a lesser depth than the height of said base pontoon plus said distance said floor will be above water; and a plurality of control means for said apparatus, each of said control means including a supplemental pontoon, coupling means between said supplemental pontoon and said apparatus, said coupling means including rigid means connected to said apparatus and means on said supplemental pontoon co-acting with said rigid means, said rigid means constraining movement of said supplemental pontoon means to a pre-determined path relative to said apparatus, said path including a position in which the center of displacement of the supplemental pontoon is above that of said base pontoon and a position in which the center of displacement of said supplemental pontoon is close to that of said base pontoon and successive positions intermediate therebetween as regards the vertical component of the distance between the centers of displacement of said pontoons, means to introduce ballast into and to withdraw ballast from said supplemental pontoon, said supplemental pontoon when without ballast being buoyant but having less buoyancy than said base pontoon when without ballast, and means for holding said supplemental pontoon at a desired position along said path against upward movement relative to said base pontoon, said means for holding being adjustable as to the position along said path at which said supplemental pontoon is held, said floor being supported upon said base pontoon independently of said means for holding said supplemental pontoon whereby said distance of said floor above said base pontoon is independent of the position at which said supplemental pontoon is held.*

*7. A submergible barge for submarine operations comprising a principal apparatus including base pontoon means comprising a pair of hollow totally closed water-tight submersible base pontoons, said base pontoons being spaced from each other to define a space for drilling operations and well completion equipment, means to introduce ballast into said base pontoon means and to withdraw ballast from said base pontoon means, an openwork rigid supporting structure secured to said base pontoon means and rising thereabove, and a floor carried by said structure above said base pontoon means and means spaced therefrom a substantial distance whereby when said base pontoon means is sunk to the marine bottom in water having a lesser depth than the height of said base pontoon means plus said distance said floor will be above water; and at least two control means disposed at least one on each side of said opening, each of said control means comprising a supplemental pontoon, coupling means between said supplemental pontoon and said apparatus, said coupling means including rigid means connected to said apparatus and means on said supplemental pontoon co-acting with said rigid means, said rigid means constraining movement of said supplemental pontoon means to a predetermined path relative to said apparatus, said path including a position in which the center of displacement of the supplemental pontoon is above that of said base pontoon means and a position in which the center of displacement of said supplemental pontoon is close to that of said base pontoon means and successive positions intermediate therebetween as regards the vertical component of the distance between the centers of displacement of said supplemental pontoon and said pontoon means, means to introduce ballast into and to withdraw ballast from said supplemental pontoon, said supplemental pontoon when without ballast being buoyant but having less buoyancy than said base pontoon means when without ballast, and means for holding said supplemental pontoon at a desired position along said path against upward movement relative to said base pontoon means, said means for holding being adjustable as to the position along said path at which said supplemental pontoon is held, said floor being supported upon said base pontoon means independently of said means for holding said supplemental pontoon whereby said distance of said floor above said base pontoon means is independent of the position at which said supplemental pontoon is held.*

References Cited in the file of this patent or the original patent

UNITED STATES PATENTS

| | | |
|---|---|---|
| 123,402 | Janicki | Feb. 6, 1872 |
| 210,185 | Clark et al. | Nov. 26, 1878 |
| 256,608 | Watts | Apr. 18, 1882 |
| 1,316,357 | Cook | Sept. 16, 1919 |
| 1,334,445 | Gaffney | Mar. 23, 1920 |
| 1,681,533 | Giliasso | Aug. 21, 1928 |
| 1,927,952 | Quigley | Sept. 26, 1933 |
| 2,248,051 | Armstrong | July 8, 1941 |
| 2,327,118 | MacKnight | Aug. 17, 1943 |
| 2,422,168 | Kirby | June 10, 1947 |
| 2,528,089 | Siecke et al. | Oct. 31, 1950 |